US012655032B1

(12) United States Patent
Ahmed et al.

(10) Patent No.: US 12,655,032 B1
(45) Date of Patent: Jun. 16, 2026

(54) MULTIPHASE STRUCTURED NANOCOMPOSITE MATERIAL

(71) Applicant: IMAM MOHAMMAD IBN SAUD ISLAMIC UNIVERSITY, Riyadh (SA)

(72) Inventors: Ehab Abdelhamed Abdelrahman Ahmed, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/197,945

(22) Filed: May 2, 2025

(51) Int. Cl.
*C01G 49/00* (2006.01)
*B82Y 30/00* (2011.01)

(52) U.S. Cl.
CPC .......... *C01G 49/0063* (2013.01); *B82Y 30/00* (2013.01); *C01P 2002/74* (2013.01); *C01P 2002/76* (2013.01); *C01P 2002/85* (2013.01); *C01P 2004/03* (2013.01); *C01P 2004/04* (2013.01); *C01P 2004/32* (2013.01); *C01P 2004/64* (2013.01); *C01P 2004/82* (2013.01)

(58) Field of Classification Search
None
See application file for complete search history.

(56) References Cited

U.S. PATENT DOCUMENTS 12,421,125 B1 * 9/2025 Ahmed ................. C01B 35/126
12,466,744 B1 * 11/2025 Ahmed ................. C01G 53/04

FOREIGN PATENT DOCUMENTS

| | | |
|---|---|---|
| CN | 115285960 B | 12/2022 |
| IN | 202341058345 A | 9/2024 |

OTHER PUBLICATIONS

Bluhm et al. Zur Synthese und Kristallstruktur von Zinkboratoxiden mit isolierten, trigonal planaren BO3-Baugruppen: Zn5Mn(BO3)2O4 und ZnFe(BO3)O / Synthesis and Crystal Structure of Zinc Borate Oxides Containing Isolated Trigonal Planar BO3 Units: Zn5Mn(BO3)2O4 and ZnFe(BO3)O; 1995.*

Pervaiz Ahmad, et al., "Single-step synthesis of magnesium-iron borates composite; an efficient electrocatalyst for dopamine detection", Microchemical Journal, vol. 180, Part B, Jan. 2021, 105679, 7 pages.

* cited by examiner

*Primary Examiner* — Guinever S Gregorio
(74) *Attorney, Agent, or Firm* — Oblon, McClelland, Maier & Neustadt, L.L.P.

(57) ABSTRACT

A $ZnFe(BO_3)O/Fe_{0.67}Mg_{1.33}B_2O_5/C$ nanocomposite material includes an orthorhombic zinc iron borate oxide ($ZnFe(BO_3)O$) phase and a triclinic iron magnesium borate oxide ($Fe_{0.67}Mg_{1.33}B_2O_5$) phase. The $ZnFe(BO_3)O/Fe_2CaO_4/C$ nanocomposite material is in the form of spherical and rod-like nanoparticles. Further, the nanocomposite material includes spherical particles with an average particle diameter ranging from 50 nanometer (nm) to 100 nm, and the rod-like particles have an average particle width ranging from 70 nm to 130 nm and an average particle length in a range from 200 nm to 600 nm. Further, a method of producing the $ZnFe(BO_3)O/Fe_{0.67}Mg_{1.33}B_2O_5/C$ nanocomposite material includes calcination of metal precursors.

20 Claims, 5 Drawing Sheets

MULTIPHASE STRUCTURED NANOCOMPOSITE MATERIAL

BACKGROUND

Technical Field

The present disclosure is directed towards nanocomposite materials, and more particularly, relates to a multiphase nanocomposite material fabricated using Pechini sol-gel method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

The integration of multifunctional nanocomposites revolutionized industrial and environmental applications due to enhanced physicochemical properties. Nanocomposites included at least two phases, with a reinforcing phase embedded within a matrix phase of metal, ceramic, or polymer elements, exhibiting enhanced functionality and multifunctional properties compared to single-component counterparts. Furthermore, the integration of multiple functional phases into a single nanocomposite structure generated synergistic effects that enhanced overall performance, resulting in enhanced surface area, adsorption capacity, and ion-exchange capabilities. Despite these advantages, phase instability, limited compositional uniformity, and high production costs restricted widespread adoption. Therefore, addressing these challenges requires advanced fabrication techniques and innovative material design strategies.

Presently, research has shifted toward the exploration of various inorganic nanostructures, particularly those based on metal oxides, carbonates, and hydroxides. These nanostructures exhibit tailored properties that enhance their applicability in fields such as catalysis, environmental remediation, and electrochemical energy storage. Research efforts have emphasized the synthesis of materials with high reactivity, stability, and functional adaptability. Synthesis techniques, including sol-gel, co-precipitation, and hydrothermal methods, have been employed to fabricate nanostructures with controlled phase composition and particle morphology. However, conventional synthesis techniques present challenges such as inconsistent particle size distribution, poor morphological control, and limited compositional uniformity. Single-phase and binary nanomaterials often lack the multifunctionality required for high-performance applications. Additionally, high production costs, complex synthesis procedures, and energy-intensive processing hinder scalability. While the Pechini sol-gel method has improved aspects of metal oxide synthesis, its application in multiphase nanocomposites remains underexplored, restricting the development of integrated systems and functional phases.

Nevertheless, examples of enhancement or modification of properties observed but drawbacks remain such as phase instability, inefficient synthesis, and functional limitations of existing multiphase nanocomposites restrict their use in catalysis, environmental remediation, and energy-related technologies. Addressing these challenges requires optimizing synthesis parameters, improving phase distribution control, and integrating hybrid fabrication approaches. The continued development of Pechini sol-gel-based multiphase nanocomposites provides opportunities for scalable, high-performance materials with tailored functionalities.

Accordingly, one object of the present disclosure is to provide a multiphase nanocomposite material fabricated using the Pechini sol-gel method, that may circumvent the above listed drawbacks and limitations of existing materials and methods known in the art.

SUMMARY

In an exemplary embodiment, a $ZnFe(BO_3)O/Fe_{0.67}Mg_{1.33}B_2O_5/C$ nanocomposite material is described. The $ZnFe(BO_3)O/Fe_{0.67}Mg_{1.33}B_2O_5/C$ nanocomposite material includes an orthorhombic zinc iron borate oxide ($ZnFe(BO_3)O$) phase and a triclinic iron magnesium borate oxide ($Fe_{0.67}Mg_{1.33}B_2O_5$) phase. The $ZnFe(BO_3)O/Fe_2CaO_4/C$ nanocomposite material is in the form of spherical and rod-like nanoparticles. The nanocomposite material includes spherical particles have an average particle diameter in a range from 50 nanometer (nm) to 100 nm and the rod-like particles have an average particle width in a range from 70 nm to 130 nm and an average particle length in a range from 200 nm to 600 nm.

In some embodiments, the spherical particles have an average particle diameter in a range from 60 nm to 90 nm, and the rod-like particles have an average particle width in a range from 80 nm to 120 nm and an average particle length in a range from 300 nm to 500 nm.

In some embodiments, the spherical particles have an average particle diameter in a range from 70 nm to 80 nm, and the rod-like particles have an average particle width in a range from 90 nm to 110 nm and an average particle length in a range from 375 nm to 430 nm.

In some embodiments, the $ZnFe(BO_3)O/Fe_{0.67}Mg_{1.33}B_2O_5/C$ nanocomposite material has an oxygen (O) content in a range from 40 atomic % (at. %) to 60 at. %, an iron (Fe) content in a range from 12 at. % to 32 at. %, a magnesium (Mg) content in a range from 1 at. % to 15 at. %, a boron (B) content in a range from 0.5 at. % to 10 at. %, a zinc (Zn) content in a range from 0.5 at. % to 10 at. %, and a carbon (C) content in a range from 0.5 at. % to 25 at. % based on the total number of atoms in the $ZnFe(BO_3)O/Fe_{0.67}Mg_{1.33}B_2O_5/C$ nanocomposite material.

In some embodiments, the $ZnFe(BO_3)O/Fe_{0.67}Mg_{1.33}B_2O_5/C$ nanocomposite material has an oxygen content in a range from 40 at. % to 60 at. %, an iron content in a range from 12 at. % to 32 at. %, a magnesium content in a range from 1 at. % to 15 at. %, a boron content in a range from 0.5 at. % to 10 at. %, a zinc content in a range from 0.5 at. % to 10 at. %, and a carbon content in a range from 0.5 at. % to 25 at. % based on the total number of atoms in the $ZnFe(BO_3)O/Fe_{0.67}Mg_{1.33}B_2O_5/C$ nanocomposite material.

In some embodiments, the $ZnFe(BO_3)O/Fe_{0.67}Mg_{1.33}B_2O_5/C$ nanocomposite material has an oxygen content in a range from 45 at. % to 55 at. %, an iron content in a range from 16 at. % to 27 at. %, a magnesium content in a range from 3 at. % to 11 at. %, a boron content in a range from 2 at. % to 8 at. %, a zinc content in a range from 2 at. % to 8 at. %, and a carbon content in a range from 5 at. % to 15 at. % based on the total number of atoms in the $ZnFe(BO_3)O/Fe_{0.67}Mg_{1.33}B_2O_5/C$ nanocomposite material.

In some embodiments, the $ZnFe(BO_3)O/Fe_{0.67}Mg_{1.33}B_2O_5/C$ nanocomposite material has an average crystallite size in a range from 50 nm to 90 nm.

In some embodiments, the $ZnFe(BO_3)O/$ $Fe_{0.67}Mg_{1.33}B_2O_5/C$ nanocomposite material has an average crystallite size in a range from 60 nm to 80 nm.

In some embodiments, the $ZnFe(BO_3)O/$ $Fe_{0.67}Mg_{1.33}B_2O_5/C$ nanocomposite material has an average crystallite size in a range from 65 nm to 75 nm.

In another exemplary embodiment, a method for making the $ZnFe(BO_3)O/Fe_{0.67}Mg_{1.33}B_2O_5/C$ nanocomposite material is described. The nanocomposite material includes adding an ammonium tartrate solution to a solution including iron(III) nitrate nonahydrate $(Fe(NO_3)_3 \cdot 9H_2O)$, zinc nitrate hexahydrate $(Zn(NO_3)_2 \cdot 6H_2O)$, magnesium nitrate hexahydrate $(Mg(NO_3)_2 \cdot 6H_2O)$ and boric acid $(H_3BO_3)$ under stirring to form a reaction mixture. Further, adding triethylene glycol (TEG, $C_6H_{14}O_4$) to the reaction mixture to form a stabilized mixture and stirring at 250° C. until a solid is formed, and calcining the solid at a temperature in a range from 600° C. to 800° C. for 2 hours to 4 hours to form the $ZnFe(BO_3)O/Fe_{0.67}Mg_{1.33}B_2O_5/C$ nanocomposite material.

In some embodiments, the concentration of ammonium tartrate in the reaction mixture is in a range from 40 grams per liter (g/L) to 70 g/L.

In some embodiments, the concentration of $Fe(NO_3)_3 \cdot 9H_2O$ in the reaction mixture is in a range from 20 g/L to 40 g/L.

In some embodiments, the concentration of $Zn(NO_3)_2 \cdot 6H_2O$ in the reaction mixture is in a range from 5 g/L to 15 g/L.

In some embodiments, the concentration of $Mg(NO_3)_2 \cdot 6H_2O$ in the reaction mixture is in a range from 5 g/L to 15 g/L.

In some embodiments, the concentration of boric acid in the reaction mixture is in a range from 15 g/L to 25 g/L.

In some embodiments, the concentration of triethylene glycol in the stabilized mixture is in a range from 30 mL/L (milliliters per liter) to 40 mL/L of stabilized mixture. In some embodiments, the solid is calcined at a temperature in a range from 550° C. to 650° C.

In some embodiments, the solid is calcined at a temperature of 600° C.

In some embodiments, the solid is calcined for 2 hours to 4 hours.

In some embodiments, the solid is calcined for 3 hours.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

4

$Fe_{0.67}Mg_{1.33}B_2O_5/C$ nanocomposite material, as determined by energy dispersive X-ray spectroscopy (EDX), according to certain embodiments.

Figure 4:
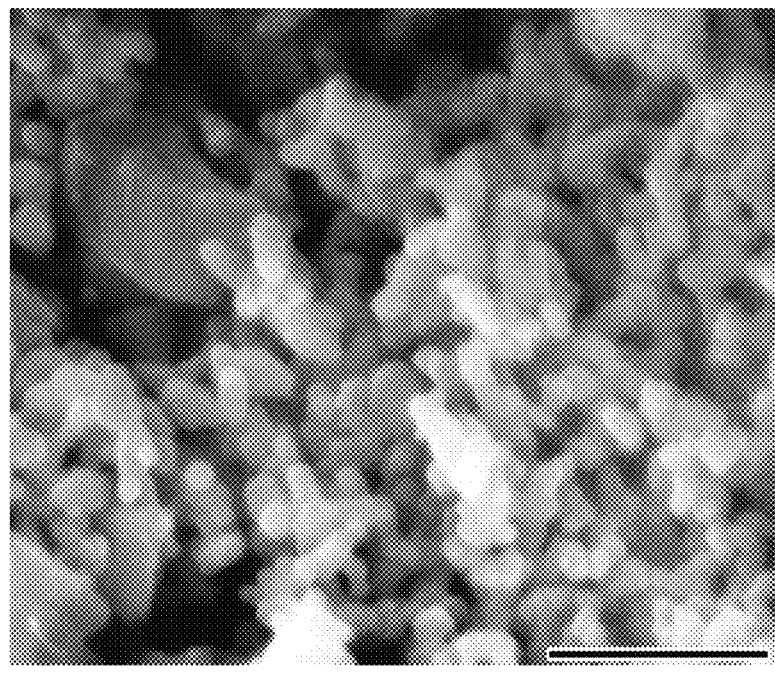

FIG. 4 shows a scanning electron microscope (SEM) image of the $ZnFe(BO_3)O/Fe_{0.67}Mg_{1.33}B_2O_5/C$ nanocomposite material, according to certain embodiments.

Figure 5:
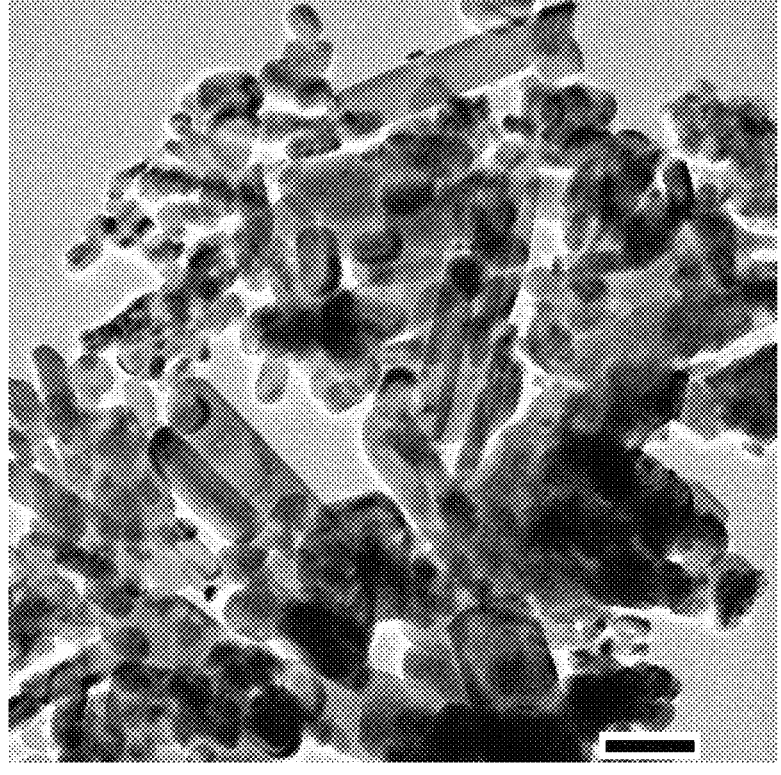

FIG. 5 shows a high-resolution transmission electron microscope (HRTEM) image of the $ZnFe(BO_3)O/$ $Fe_{0.67}Mg_{1.33}B_2O_5/C$ nanocomposite material, according to certain embodiments.

DETAILED DESCRIPTION

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (C)±3° C. in the present disclosure.

As used herein, the term 'nanoparticles (NPs)' refers to particles having a particle size of 1 nanometer (nm) to 500 nm within the scope of the present disclosure.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are enhanced compared to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is a parameter in characterizing the porous structure of materials, such as adsorbents or catalysts.

As used herein, the term 'average particle size' refers to the mean diameter of nanoparticles in a sample, typically calculated from measurements obtained using techniques such as scanning electron microscopy (SEM) or transmission electron microscopy (TEM), representing the typical size of the particles in the distribution.

As used herein, the term 'average crystallite size' refers to the mean size of crystalline regions in a material, typically determined through X-ray diffraction (XRD) analysis, and represents the size of the individual crystal domains within the sample, excluding any amorphous material.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

An aspect of the present disclosure is directed to a method of synthesizing a $ZnFe(BO_3)O/Fe_{0.67}Mg_{1.33}B_2O_5/C$ nanocomposite using the Pechini sol-gel method, enabling a cost-effective and scalable fabrication process. The method leads to the formation of orthorhombic and triclinic crystal phases with residual carbon, achieving uniform elemental distribution and diverse morphological features for advanced applications.

A $ZnFe(BO_3)O/Fe_{0.67}Mg_{1.33}B_2O_5/C$ nanocomposite material (also referred to as a nanocomposite material or a nanocomposite) is described. The nanocomposite includes an orthorhombic $ZnFe(BO_3)O$ phase, and a triclinic $Fe_{0.67}Mg_{1.33}B_2O_5$ phase. In some embodiments, the nanocomposite may include crystalline phases, but is not limited to quartz, calcite, hematite, magnetite, goethite, dolomite, albite, anorthite, pyrite, fluorite, halite, barite, apatite, rutile, and zircon. In some embodiments, the nanocomposite has an average crystallite size in a range from 20 to 120 nm, preferably 50 to 90 nm, preferably 60 to 80 nm, preferably 65 to 75 nm, preferably 65 to 70 nm. In a preferred embodiment, the nanocomposite has an average crystallite size of 69.59 nm.

In some embodiments, the nanocomposite is porous. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

In some embodiments, in the nanocomposite may be in a form that includes sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nano-discs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible. In a preferred embodiment, nanocomposite is in the form of spherical and rod-like nanoparticles.

In some embodiments, the spherical particles have an average particle diameter in a range from 20 to 130 nm, preferably 50 to 100 nm, preferably 60 to 90 nm, preferably 70 to 80 nm, preferably 65 to 100 nm, preferably 70 to 100 nm, preferably 75 to 100 nm, preferably 80 to 100 nm, preferably 90 to 100 nm. In a preferred embodiment, the spherical particles have an average particle diameter of 74.35 nm.

In some embodiments, the rod-like particles have an average particle width in a range from 40 to 170 nm, preferably 70 to 130 nm, preferably 80 to 120 nm, preferably 90 to 110 nm, preferably 85 to 130 nm, preferably 90 to 130 nm, preferably 100 to 130 nm, preferably 110 to 130 nm, preferably 120 to 130 nm. In a preferred embodiment, the rod-like particles have an average particle width of 106.06 nm.

In some embodiments, the rod-like particles have an average particle length in a range from 10 to 1000 nm, preferably 200 to 600 nm, preferably 300 to 500 nm, preferably 375 to 430 nm, preferably 350 to 600 nm, preferably 400 to 600 nm, preferably 450 to 600 nm, preferably 500 to 600 nm, preferably 550 to 600 nm. In a preferred embodiment, the rod-like particles have an average particle length of 410.81 nm.

In some embodiments, the nanocomposite has an oxygen content in a range from 30 to 70 atomic % (at. %), preferably 40 to 60 at. %, preferably 40 to 50 at. %, preferably 45 to 55 at. %, preferably 47 to 53 at. %, preferably 45 to 55 at. % based on the total number of atoms in the nanocomposite. In a preferred embodiment, the nanocomposite has an oxygen content of 51.4% based on the total number of atoms in the nanocomposite.

In some embodiments, the nanocomposite has iron content in a range from 8 to 40 at. %, preferably 12 to 32 at. %, preferably 15 to 30 at. %, preferably 15 to 25 at. %, preferably 16 to 27 at. %, based on the total number of atoms in the nanocomposite material. In a preferred embodiment, the nanocomposite has iron content of 22.0% based on the total number of atoms in the nanocomposite.

In some embodiments, the nanocomposite has magnesium content in a range from 0.1 to 25 at. %, preferably 1 to 15 at. %, preferably 5 to 10 at. %, preferably 6 to 7 at. %, preferably 3 to 11 at. based on the total number of atoms in the nanocomposite. In a preferred embodiment, the nanocomposite has magnesium content of 7.3% based on the total number of atoms in the nanocomposite.

In some embodiments, the nanocomposite has boron content in a range from 0.1 to 15 at. %, preferably 0.5 to 10 at. %, preferably 1 to 10 at. %, preferably 3 to 7 at. %, preferably 2 to 8 at. %, based on the total number of atoms in the nanocomposite. In a preferred embodiment, the nanocomposite has a boron content of 5.1% based on the total number of atoms in the nanocomposite.

In some embodiments, the nanocomposite has zinc content in a range from 0.1 to 15 at. %, preferably 0.5 to 10 at. %, preferably 1 to 10 at. %, preferably 1 to 7 at. %, preferably 2 to 8 at. %, based on the total number of atoms in the nanocomposite. In a preferred embodiment, the nanocomposite has a zinc content of 4.5% based on the total number of atoms in the nanocomposite.

In some embodiments, the nanocomposite has a carbon content in a range from 0.1 to 35 at. %, preferably 0.5 to 25 at. %, preferably 0.5 to 20 at. %, preferably 1 to 15 at. %, preferably 5 to 15 at. %, based on the total number of atoms in the nanocomposite. In a preferred embodiment, the nanocomposite has a carbon content of 9.7% based on the total number of atoms in the nanocomposite.

In one or more embodiments, the nanocomposite has a $ZnFe(BO_3)O$ content in a range from 30 to 45 wt. %, a $Fe_{0.67}Mg_{1.33}B_2O_5$ content in a range from 40 to 65 wt. %, and a C content in a range from 5 to 15 wt. %, all compared to the total weight of the nanocomposite.

Figure 1A:
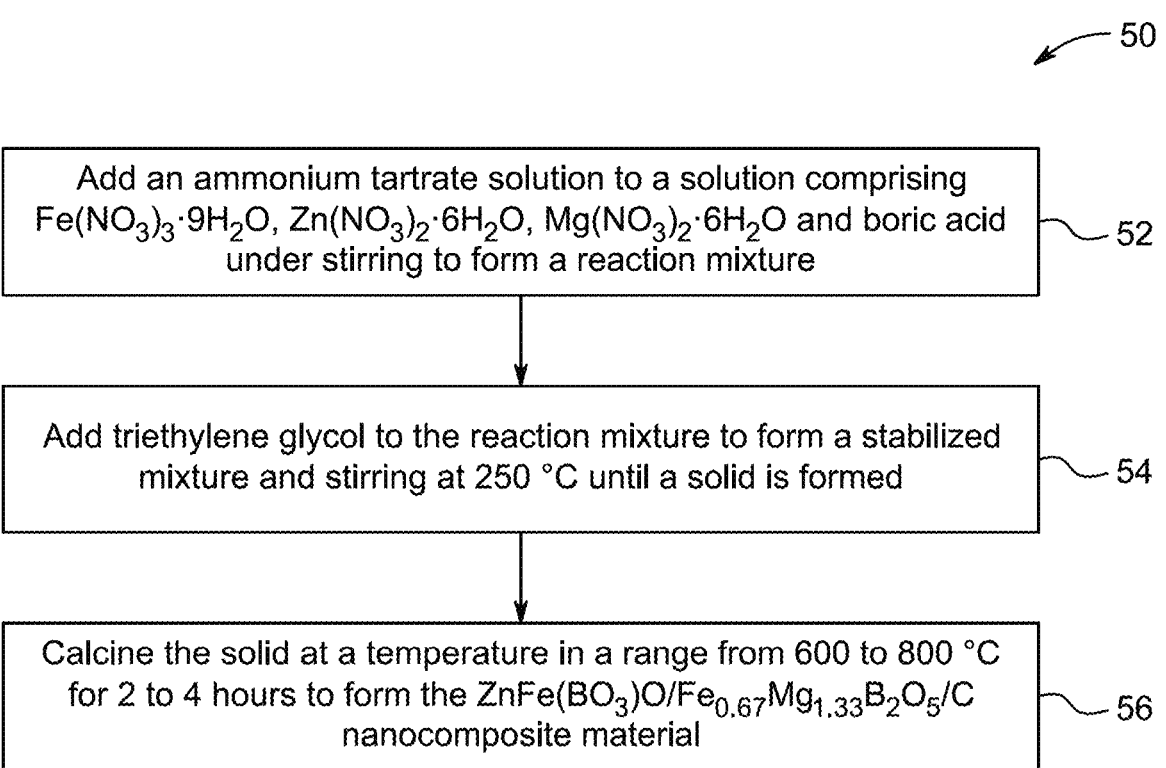
FIG. 1A illustrates an exemplary flow chart depicting a method for forming a $ZnFe(BO_3)O/Fe_{0.67}Mg_{1.33}B_2O_5/C$ nanocomposite, according to certain embodiments.

FIG. 1A illustrates a schematic flow chart of a method 50 of preparing the $ZnFe(BO_3)O/Fe_{0.67}Mg_{1.33}B_2O_5/C$ nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes adding an ammonium tartrate solution to a solution comprising $Fe(NO_3)_3 \cdot 9H_2O$, $Zn(NO_3)_2 \cdot 6H_2O$, $Mg(NO_3)_2 \cdot 6H_2O$ and boric acid under stirring to form a reaction mixture. In some embodiments, apart from tartaric acid, other organic acids such as citric acid, malic acid, succinic acid, oxalic acid, acetic acid, formic acid, lactic acid, gluconic acid, fumaric acid, ascorbic acid, mandelic acid, benzoic acid, salicylic acid, propionic acid, valeric acid, caproic acid, adipic acid, pimelic acid, suberic acid, azelaic acid, sebacic acid, cinnamic acid, gallic acid, ellagic acid, phthalic acid, isophthalic acid, terephthalic acid, uric acid, and kojic acid may also be used. In some embodiments, the concentration of ammonium tartrate in the reaction mixture is in a range from 20 to 90 g/L, preferably 40 to 70 g/L, preferably 45 to 70 g/L, preferably 50 to 70 g/L, preferably 55 to 70 g/L, preferably 60 to 70 g/L, preferably 65 to 70 g/L. In a preferred embodiment, the concentration of ammonium tartrate in the reaction mixture is 55.35 g/L.

The $Fe(NO_3)_3 \cdot 9H_2O$ is used as the iron salt, although in some embodiments, other iron salt may also be used, such as iron chloride, iron sulfate, iron acetate, iron phosphate, iron nitrate, iron oxide, iron oxalate, iron hydroxide, iron bromide, iron iodide, iron tartrate, iron lactate, iron citrate, iron pyrophosphate, iron benzoate, iron methanesulfonate, iron formate, iron methanearsonate, iron nitrate hexahydrate, iron dichloride, iron phosphate monohydrate, iron selenate, and iron acetylacetonate. In some embodiments, the concentration of $Fe(NO_3)_3 \cdot 9H_2O$ in the reaction mixture may range from 10 to 50 g/L, preferably 20 to 40 g/L, preferably 25 to 40 g/L, preferably 30 to 40 g/L, preferably 35 to 40 g/L. In a preferred embodiment, the concentration of $Fe(NO_3)_3 \cdot 9H_2O$ is 30.35 g/L.

$Zn(NO_3)_2 \cdot 6H_2O$ is used as the zinc salt, although in some embodiments, other zinc salts may also be used, such as zinc chloride, zinc acetate, zinc sulfate, zinc oxide, zinc carbonate, zinc nitrate, zinc bromide, zinc iodide, zinc sulfate heptahydrate, zinc chloride hexahydrate, zinc acetate dihydrate, zinc nitrate tetrahydrate, zinc thiocyanate, zinc formate, zinc methanesulfonate, zinc isothiocyanate, zinc citrate, zinc pyrophosphate, zinc orthophosphate, zinc laurate, zinc stearate, zinc benzoate, zinc salicylate, zinc hydroxide, zinc peroxysulfate, zinc tartrate, zinc lactate, zinc picrate, zinc gluconate, and zinc ascorbate. In some embodiments, the concentration of $Zn(NO_3)_2 \cdot 6H_2O$ in the reaction mixture may range from 2.5 to 20 g/L, preferably 5 to 15 g/L, preferably 7 to 15 g/L, preferably 9 to 15 g/L, preferably 12 to 15 g/L. In a preferred embodiment, the concentration of $Zn(NO_3)_2 \cdot 6H_2O$ is 11 g/L.

$Mg(NO_3)_2 \cdot 6H_2O$ is used as the magnesium salt, although in some embodiments, other magnesium salts may also be used, such as magnesium chloride, magnesium sulfate, magnesium carbonate, magnesium hydroxide, magnesium oxide, magnesium acetate, magnesium citrate, magnesium lactate, magnesium gluconate, magnesium phosphate, magnesium ascorbate, magnesium benzoate, magnesium malate, magnesium fumarate, magnesium oxalate, magnesium stearate, magnesium tartrate, magnesium salicylate, magnesium formate, magnesium propionate, magnesium valerate, magnesium succinate, magnesium iodide, magnesium bromide, magnesium fluoride, magnesium thiocyanate, magnesium perchlorate, magnesium chromate, magnesium molybdate, and magnesium tungstate. In some embodiments, the concentration of $Mg(NO_3)_2 \cdot 6H_2O$ in the reaction mixture is in a range from 2.5 to 25 g/L, preferably 5 to 15 g/L, preferably 7 to 15 g/L, preferably 9 to 15 g/L, preferably 12 to 15 g/L. In a preferred embodiment, the concentration of $Mg(NO_3)_2 \cdot 6H_2O$ is 9.64 g/L.

Boric acid is used as a boron source, although in some embodiments, other boron sources such as boron oxide, boron nitride, boron carbide, sodium borate, lithium borate, potassium borate, calcium borate, magnesium borate, zinc borate, ammonium borate, aluminum borate, iron borate, cobalt borate, nickel borate, manganese borate, bismuth borate, strontium borate, lanthanum borate, cerium borate, yttrium borate, zirconium borate, boron trifluoride, boron trichloride, boron tribromide, boron phosphate, boron sulfate, tetraethyl orthoborate, trimethyl borate, triethyl borate, triphenyl borate, etc, may also be used. In some embodiments, the concentration of boric acid in the reaction mixture may range from 10 to 30 g/L, preferably 15 to 25 g/L, preferably 17 to 25 g/L, preferably 19 to 25 g/L, preferably 22 to 25 g/L. In a preferred embodiment, the concentration of boric acid is 20.8 g/L.

At step 54, the method 50 includes adding triethylene glycol to the reaction mixture to form a stabilized mixture and stirring at 250° C. until a solid is formed. In some embodiments, the concentration of triethylene glycol in the stabilized mixture is in a range from 10 to 70 ml per liter, preferably 30 to 40 ml per liter, preferably 32 to 40 ml per liter, preferably 34 to 40 ml per liter, preferably 36 to 40 ml per liter, preferably 38 to 40 ml per liter of stabilized mixture. In a preferred embodiment, the concentration of triethylene glycol in the stabilized mixture is 34.5 ml per liter of stabilized mixture.

At step 56, the method 50 includes calcining the solid at a temperature in a range from 600 to 800° C. for 2 to 4 hours to form the $ZnFe(BO_3)O/Fe_{0.67}Mg_{1.33}B_2O_5/C$ nanocomposite material. In some embodiments, the solid is calcined at a temperature in a range from 600 to 800° C., preferably 650 to 800° C., preferably 700 to 800° C., preferably 750 to 800° C., preferably 550 to 650° C. In a preferred embodiment, the solid is calcined at 700° C. In some embodiments, the solid is calcined for 2 to 4 hours, preferably 2.5 to 4 hours, preferably 3 to 4 hours, preferably 3.5 to 4 hours. In a preferred embodiment, the solid is calcined for 3 hours.

The following examples are provided solely for illustration and are not to be construed as limitations of the present disclosure, as many variations thereof are possible without departing from the spirit and scope of the present disclosure.

EXAMPLES

The following examples demonstrate a multiphase nanocomposite material and a method of preparation thereof. The examples are provided solely for illustration and are not to be construed as limitations of the present disclosure, as many variations thereof are possible without departing from the spirit and scope of the present disclosure.

Figure 1B:
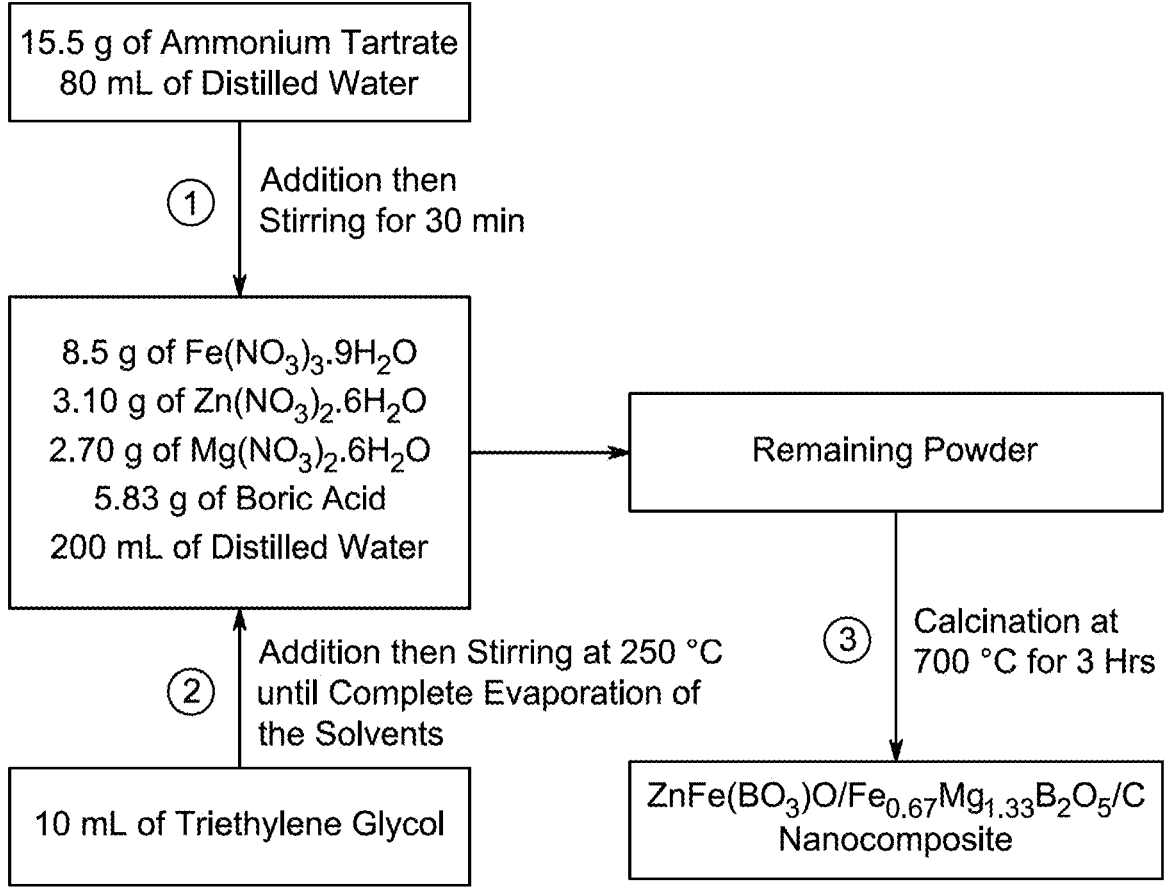
FIG. 1B illustrates an exemplary block diagram of synthesizing the $ZnFe(BO_3)O/Fe_{0.67}Mg_{1.33}B_2O_5/C$ nanocomposite, according to certain embodiments.

Example 1: Synthesis of $ZnFe(BO_3)O/Fe_{0.67}Mg_{1.33}B_2O_5/C$ Nanocomposite According to the present disclosure, the $ZnFe(BO_3)O/Fe_{0.67}Mg_{1.33}B_2O_5/C$ nanocomposite was synthesized using the Pechini sol-gel method, as described in FIG. 1B. In particular, for synthesis of the nanocomposite, 15.5 grams (g) of ammonium tartrate was dissolved in 80 milliliters (mL) of distilled water (DW). Further, 8.5 g of iron(III) nitrate nonahydrate ($Fe(NO_3)_3\cdot 9H_2O$), 3.10 g of zinc nitrate hexahydrate ($Zn(NO_3)_2\cdot 6H_2O$), 2.70 g of magnesium nitrate hexahydrate ($Mg(NO_3)_2\cdot 6H_2O$), and 5.83 g of boric acid ($H_3BO_3$) were dissolved in 200 mL of distilled water. The solution prepared in the first step was then added to the second solution under continuous stirring for 30 minutes. Subsequently, 10 mL of triethylene glycol (TEG, $C_6H_{14}O_4$) was added to the mixture, and stirring continued at 250° C. until complete evaporation of the solvents occurred. The resultant solid powder was collected and subjected to calcination at 700° C. for 3 hours to obtain the $ZnFe(BO_3)O/Fe_{0.67}Mg_{1.33}B_2O_5/C$ nanocomposite.

Figure 2:
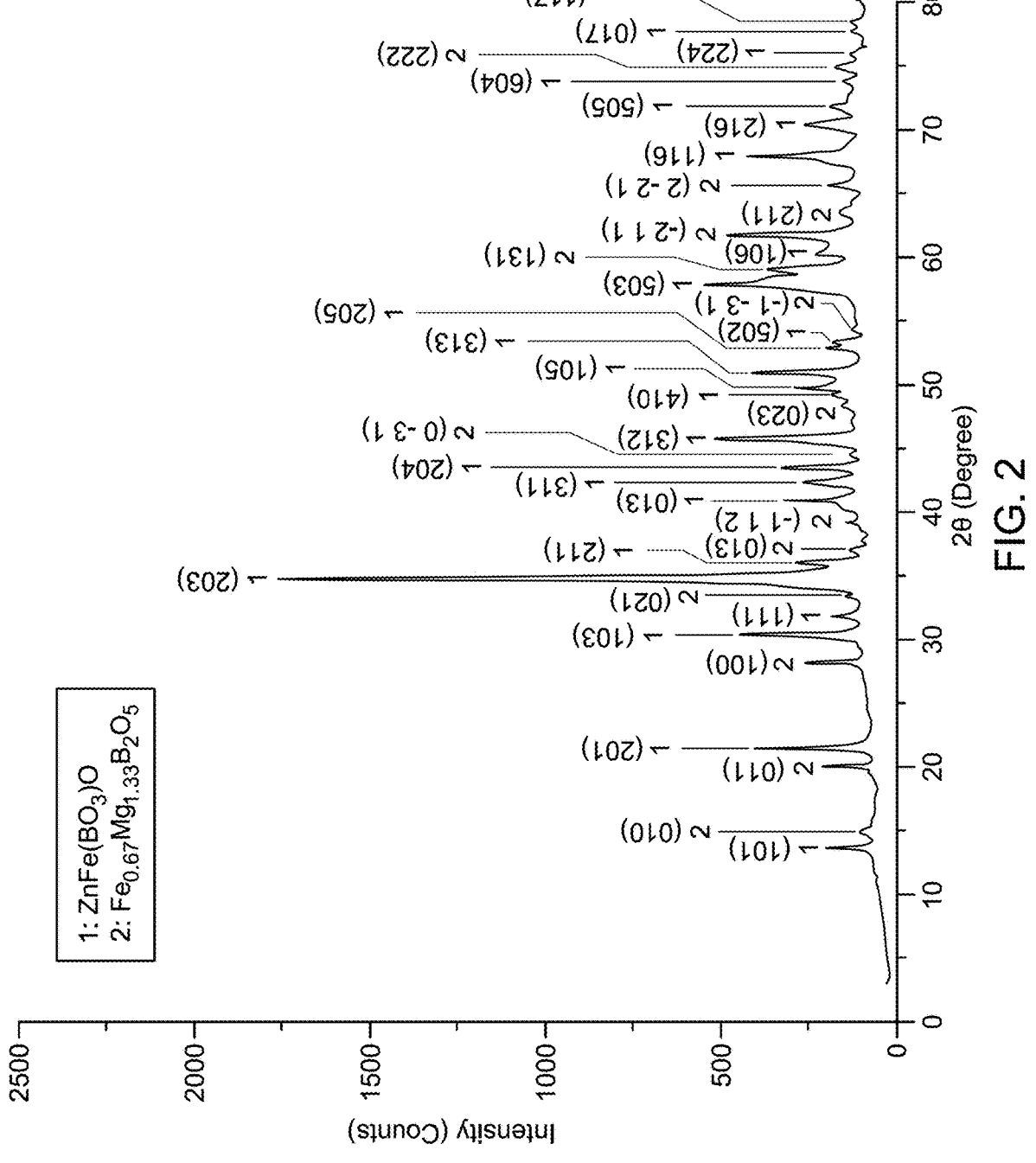
FIG. 2 is a graph depicting X-ray diffraction (XRD) pattern of the $ZnFe(BO_3)O/Fe_{0.67}Mg_{1.33}B_2O_5/C$ nanocomposite material, according to certain embodiments.

The X-ray diffraction (XRD) pattern confirmed the phase composition and crystallinity of the $ZnFe(BO_3)O/Fe_{0.67}Mg_{1.33}B_2O_5/C$ nanocomposites, as shown in FIG. 2. Further, structural and crystallographic properties, as determined by XRD, are listed in Table 1. The nanocomposite identified two crystalline phases included zinc iron borate oxide ($ZnFe(BO_3)O$) and magnesium iron borate ($Fe_{0.67}Mg_{1.33}B_2O_5$). Further, $ZnFe(BO_3)O$ corresponding to JCPDS card (No. 01-085-0146) and exhibited an orthorhombic crystal system, while $Fe_{0.67}Mg_{1.33}B_2O_5$ corresponds to JCPDS card (No. 01-084-7670) and crystallizes in a triclinic system. The $ZnFe(BO_3)O$ exhibited 2θ angles of 13.42°, 21.39°, 30.22°, 31.68°, 34.73°, 35.88°, 40.82°, 42.28°, 43.43°, 45.53°, 48.99°, 49.74°, 50.89°, 52.77°, 53.29°, 57.82°, 60.23°, 67.89°, 70.29°, 71.66°, 73.56°, 75.86°, 77.54°, and 78.38°, with the corresponding Miller indices (101), (201), (103), (111), (203), (211), (013), (311), (204), (312), (410), (105), (313), (205), (502), (503), (106), (116), (216), (505), (604), (224), (017), and (117), respectively. Further, $Fe_{0.67}Mg_{1.33}B_2O_5$, designated the observed 2θ angles of 14.79°, 19.94°, 28.11°, 33.25°, 36.94°, 39.14°, 44.49°, 48.15°, 54.25°, 58.97°, 61.59°, 63.38°, 65.57°, and 74.82°, with the corresponding Miller indices of (010), (011), (100), (021), (013), (–1 1 2), (0 –3 1), (023), (–1 –3 1), (131), (–2 1 1), (211), (2 –2 1), and (222), respectively. The average crystallite size of the nanocomposite was 69.59 nm.

TABLE 1

Structural and crystallographic properties of the nanocomposite components, as determined by XRD.

| | Components of nanocomposite | | | Average crystallite size of nano-composite (nm) |
| --- | --- | --- | --- | --- |
| Phase | Chemical name | Card No. | Crystal system | |
| $ZnFe(BO_3)O$ | Zinc iron borate oxide | JCPDS-01-085-0146 | Orthorhombic | 69.59 |
| $Fe_{0.67}Mg_{1.33}B_2O_5$ | Magnesium iron borate | JCPDS-01-084-7670 | Triclinic | |

Figure 3:
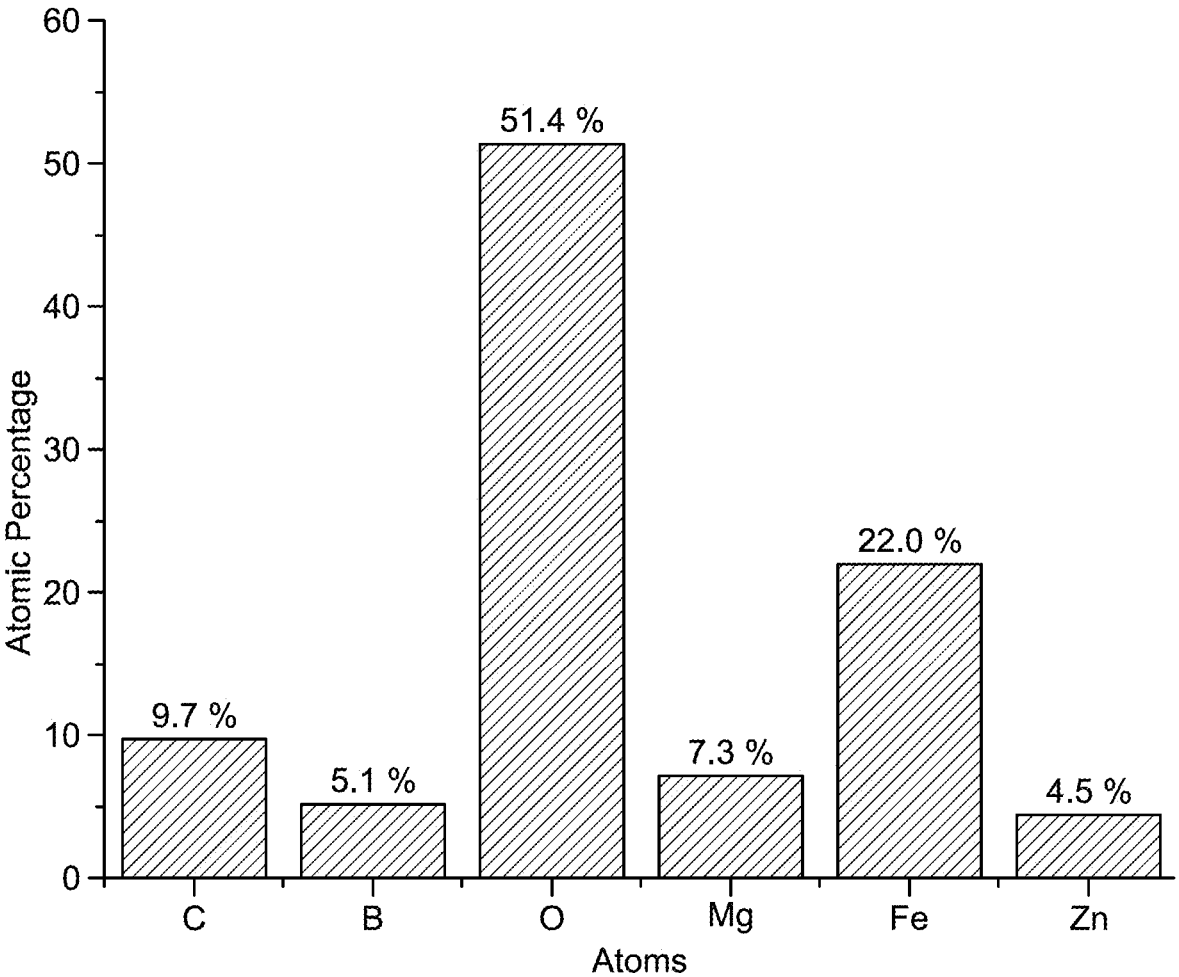
FIG. 3 is a graph depicting the distribution of atomic percentages of elements in the $ZnFe(BO_3)O/$

The elemental composition of the $ZnFe(BO_3)O/Fe_{0.67}Mg_{1.33}B_2O_5/C$ nanocomposite was determined using energy-dispersive X-ray (EDX) analysis, and the atomic percentages of the constituent elements are shown in FIG. 3. The analysis revealed that the nanocomposite exhibits atomic percentages of 51.4% oxygen (O), 22.0% iron (Fe), 9.7% carbon (C), 7.3% magnesium, 5.1% boron (B), and 4.5% zinc (Zn). The presence of oxygen was attributed to the oxide phases of the nanocomposite, whereas the observed carbon content originates from the decomposition of ammonium tartrate and triethylene glycol used during the synthesis process via the Pechini sol-gel method. These compounds served as complexing agents and carbon sources, which facilitate the formation of the nanocomposite structure. The uniform distribution of the elements confirmed the successful synthesis and homogeneity of the $ZnFe(BO_3)O/Fe_{0.67}Mg_{1.33}B_2O_5/C$ nanocomposite.

The morphology of the $ZnFe(BO_3)O/Fe_{0.67}Mg_{1.33}B_2O_5/C$ nanocomposite was characterized using scanning electron microscopy (SEM), as shown in FIG. 4. The SEM image revealed a mixture of spherical and irregularly shaped particles, indicating a diverse particle morphology within the nanocomposite. The average grain size of the nanocomposite was determined to be 127.29 nm, reflecting the nanoscale nature and uniformity in particle size. The above listed observations highlight the successful synthesis and structural characteristics of the $ZnFe(BO_3)O/Fe_{0.67}Mg_{1.33}B_2O_5/C$ nanocomposite.

In addition, the morphology and structure of the $ZnFe(BO_3)O/Fe_{0.67}Mg_{1.33}B_2O_5/C$ nanocomposite were analyzed using high-resolution transmission electron microscopy (HRTEM), as shown in FIG. 5. The image revealed a mixture of spherical and irregularly shaped nanoparticles with average particle diameter of 74.35 nm. Additionally, rod-like nanoparticles with an average particle width of 106.06 nm and an average particle length of 410.81 nm indicated a diverse morphological composition. The spherical particles represented the smaller components of the nanocomposite, while the rod-like structures suggested the presence of elongated crystallites formed during the synthesis process. The clear visualization of these shapes demonstrated the successful formation of a heterogeneous nano-composite with well-defined features and confirmed the nanoscale characteristics.

The aspects of the present disclosure describe the ZnFe $(BO_3)O/Fe_{0.67}Mg_{1.33}B_2O_5/C$ nanocomposite, fabricated using the Pechini sol-gel method. The prepared nanocomposites exhibited potential for commercial applications across various fields. The nanocomposite with well-defined structural and morphological properties provides a cost-effective, simple, and scalable process. It achieved high compositional homogeneity and tailored nanoscale features, as demonstrated by the uniform crystallinity and diverse morphologies observed in the nanocomposite. The present disclosure provides a solution to the inefficiency and inconsistency of current techniques by offering a reproducible approach for fabricating advanced materials with potential applications in various fields. The disclosure demonstrated a substantial improvement over existing methods and paves the way for the development of efficient and versatile nanocomposite materials.

The distinctiveness of the ZnFe(BO_3)O/Fe_{0.67}Mg_{1.33}B_2O_5/C$ nanocomposite arose from the integration of zinc iron borate oxide (ZnFe(BO_3)O) and iron magnesium borate oxide ($Fe_{0.67}Mg_{1.33}B_2O_5$) phases with residual carbon, providing a cost-effective and scalable fabrication process through the Pechini sol-gel method. XRD analysis confirmed the formation of orthorhombic ZnFe(BO_3)O and triclinic $Fe_{0.67}Mg_{1.33}B_2O_5$ phases, with an average crystallite size of 69.59 nm, reflecting the controlled synthesis and high crystallinity of the material. SEM analysis revealed a heterogeneous morphology, consisting of spherical and irregularly shaped particles with an average grain size of 127.29 nm. EDX spectroscopy indicated the elemental composition as 51.4% oxygen, 22.0% iron, 9.7% carbon, 7.3% magnesium, 5.1% boron, and 4.5% zinc, confirming the uniform distribution of elements across the nanocomposite. HRTEM further highlighted the presence of spherical nanoparticles with an average diameter of 74.35 nm and rod-like nanoparticles with an average width of 106.06 nm and length of 410.81 nm, emphasizing the diverse structural characteristics. The successful integration of multiple crystalline phases, coupled with the controlled morphology and nanoscale precision, positioned the nanocomposite as an advancement in multifunctional material design, offering enhanced performance and broader application potential.

The ZnFe(BO_3)O/Fe_{0.67}Mg_{1.33}B_2O_5/C$ nanocomposite may be utilized in advanced water treatment technologies for the efficient removal of heavy metals and organic pollutants. The distinctive structural and morphological properties make the nanocomposite suitable for applications in catalysis, including oxidative and reductive reactions in industrial processes. Additionally, the nanocomposite's electrical and magnetic characteristics may be leveraged in energy storage devices and magnetic data storage systems.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A ZnFe(BO_3)O/Fe_{0.67}Mg_{1.33}B_2O_5/C$ nanocomposite material, comprising:

an orthorhombic ZnFe(BO_3)O phase; and
a triclinic $Fe_{0.67}Mg_{1.33}B_2O_5$ phase, wherein the ZnFe(BO_3)O/Fe_{0.67}Mg_{1.33}B_2O_5/C$ nanocomposite material is in the form of spherical and rod-like nanoparticles, wherein the spherical particles have an average particle diameter in a range from 50 to 100 nm, and wherein the rod-like particles have an average particle width in a range from 70 to 130 nm and an average particle length in a range from 200 to 600 nm.

2. The ZnFe(BO_3)O/Fe_{0.67}Mg_{1.33}B_2O_5/C$ nanocomposite material of claim 1, wherein the spherical particles have an average particle diameter in a range from 60 to 90 nm, and the rod-like particles have an average particle width in a range from 80 to 120 nm and an average particle length in a range from 300 to 500 nm.

3. The ZnFe(BO_3)O/Fe_{0.67}Mg_{1.33}B_2O_5/C$ nanocomposite material of claim 2, wherein the spherical particles have an average particle diameter in a range from 70 to 80 nm, and the rod-like particles have an average particle width in a range from 90 to 110 nm and an average particle length in a range from 375 to 430 nm.

4. The ZnFe(BO_3)O/Fe_{0.67}Mg_{1.33}B_2O_5/C$ nanocomposite material of claim 1, wherein the ZnFe(BO_3)O/Fe_{0.67}Mg_{1.33}B_2O_5/C$ nanocomposite material has an oxygen content in a range from 40 to 60 atomic % (at. %), an iron content in a range from 12 to 32 at. %, a magnesium content in a range from 1 to 15 at. %, a boron content in a range from 0.5 to 10 at. %, a zinc content in a range from 0.5 to 10 at. %, and a carbon content in a range from 0.5 to 25 at. % based on the total number of atoms in the ZnFe(BO_3)O/Fe_{0.67}Mg_{1.33}B_2O_5/C$ nanocomposite material.

5. The ZnFe(BO_3)O/Fe_{0.67}Mg_{1.33}B_2O_5/C$ nanocomposite material of claim 4, wherein the ZnFe(BO_3)O/Fe_{0.67}Mg_{1.33}B_2O_5/C$ nanocomposite material has an oxygen content in a range from 40 to 60 atomic % (at. %), an iron content in a range from 12 to 32 at. %, a magnesium content in a range from 1 to 15 at. %, a boron content in a range from 0.5 to 10 at. %, a zinc content in a range from 0.5 to 10 at. %, and a carbon content in a range from 0.5 to 25 at. % based on the total number of atoms in the ZnFe(BO_3)O/Fe_{0.67}Mg_{1.33}B_2O_5/C$ nanocomposite material.

6. The ZnFe(BO_3)O/Fe_{0.67}Mg_{1.33}B_2O_5/C$ nanocomposite material of claim 5, wherein the ZnFe(BO_3)O/Fe_{0.67}Mg_{1.33}B_2O_5/C$ nanocomposite material has an oxygen content in a range from 45 to 55 atomic % (at. %), an iron content in a range from 16 to 27 at. %, a magnesium content in a range from 3 to 11 at. %, a boron content in a range from 2 to 8 at. %, a zinc content in a range from 2 to 8 at. %, and a carbon content in a range from 5 to 15 at. % based on the total number of atoms in the ZnFe(BO_3)O/Fe_{0.67}Mg_{1.33}B_2O_5/C$ nanocomposite material.

7. The ZnFe(BO_3)O/Fe_{0.67}Mg_{1.33}B_2O_5/C$ nanocomposite material of claim 1, wherein the ZnFe(BO_3)O/Fe_{0.67}Mg_{1.33}B_2O_5/C$ nanocomposite material has an average crystallite size in a range from 50 to 90 nm.

8. The ZnFe(BO_3)O/Fe_{0.67}Mg_{1.33}B_2O_5/C$ nanocomposite material of claim 7, wherein the ZnFe(BO_3)O/Fe_{0.67}Mg_{1.33}B_2O_5/C$ nanocomposite material has an average crystallite size in a range from 60 to 80 nm.

9. The ZnFe(BO_3)O/Fe_{0.67}Mg_{1.33}B_2O_5/C$ nanocomposite material of claim 8, wherein the ZnFe(BO_3)O/Fe_{0.67}Mg_{1.33}B_2O_5/C$ nanocomposite material has an average crystallite size in a range from 65 to 75 nm.

10. A method for making the ZnFe(BO_3)O/Fe_{0.67}Mg_{1.33}B_2O_5/C$ nanocomposite material of claim 1, comprising:

adding an ammonium tartrate solution to a solution comprising $Fe(NO_3)_3 \cdot 9H_2O$, $Zn(NO_3)_2 \cdot 6H_2O$, $Mg(NO_3)_2 \cdot 6H_2O$ and boric acid under stirring to form a reaction mixture;

adding triethylene glycol to the reaction mixture to form a stabilized mixture and stirring at 250° C. until a solid is formed; and calcining the solid at a temperature in a range from 600 to 800° C. for 2 to 4 hours to form the $ZnFe(BO_3)O/Fe_{0.67}Mg_{1.33}B_2O_5/C$ nanocomposite material.

11. The method of claim 10, wherein the concentration of ammonium tartrate in the reaction mixture is in a range from 40 to 70 g/L.

12. The method of claim 10, wherein the concentration of $Fe(NO_3)_3 \cdot 9H_2O$ in the reaction mixture is in a range from 20 to 40 g/L.

13. The method of claim 10, wherein the concentration of $Zn(NO_3)_2 \cdot 6H_2O$ in the reaction mixture is in a range from 5 to 15 g/L.

14. The method of claim 10, wherein the concentration of $Mg(NO_3)_2 \cdot 6H_2O$ in the reaction mixture is in a range from 5 to 15 g/L.

15. The method of claim 10, wherein the concentration of boric acid in the reaction mixture is in a range from 15 to 25 g/L.

16. The method of claim 10, wherein the concentration of triethylene glycol in the stabilized mixture is in a range from 30 to 40 ml per liter of stabilized mixture.

17. The method of claim 10, wherein the solid is calcined at a temperature in a range from 550 to 650° C.

18. The method of claim 17, wherein the solid is calcined at a temperature of 600° C.

19. The method of claim 10, wherein the solid is calcined for 2 to 4 hours.

20. The method of claim 19, wherein the solid is calcined for 3 hours.

\* \* \* \* \*